UNITED STATES PATENT OFFICE.

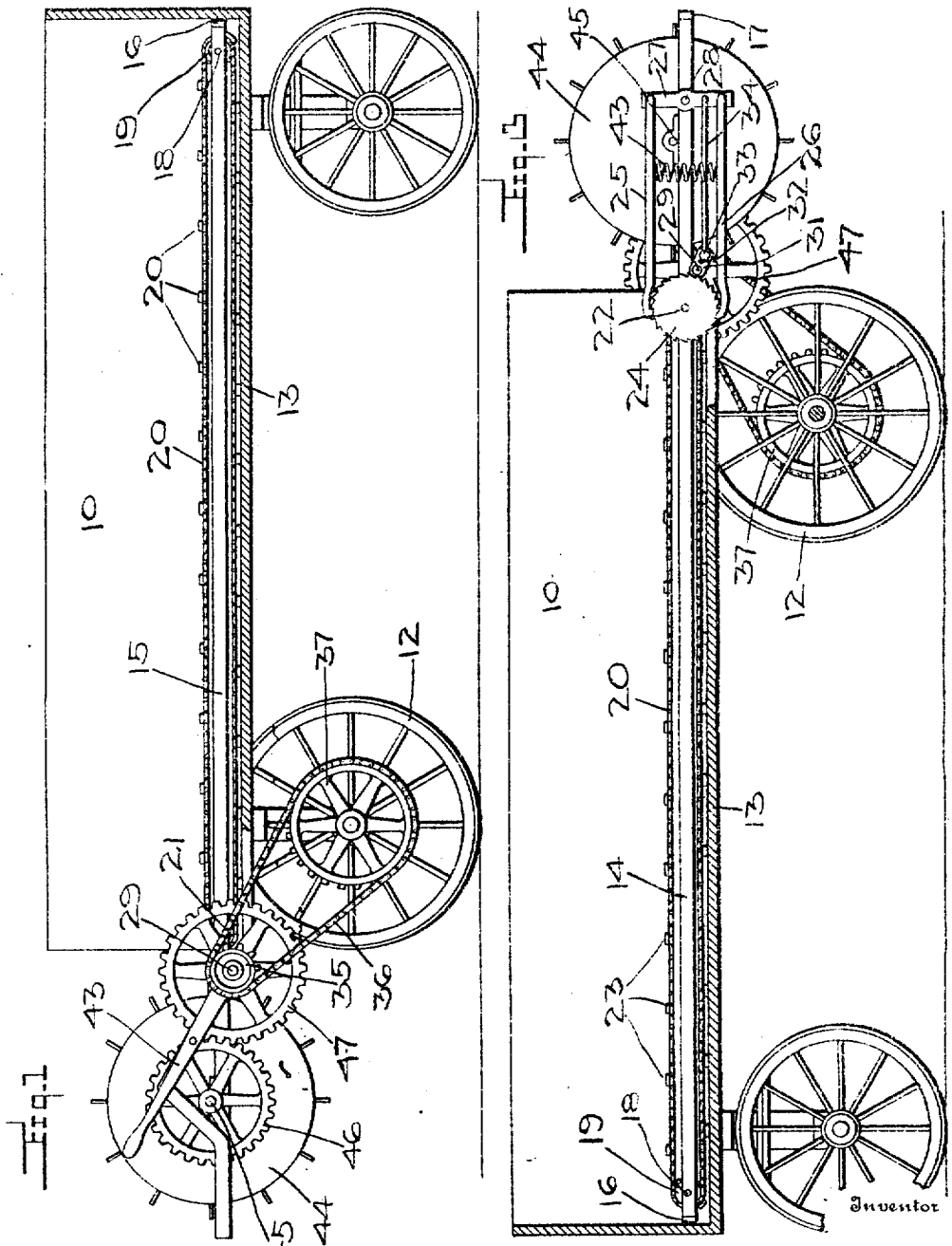

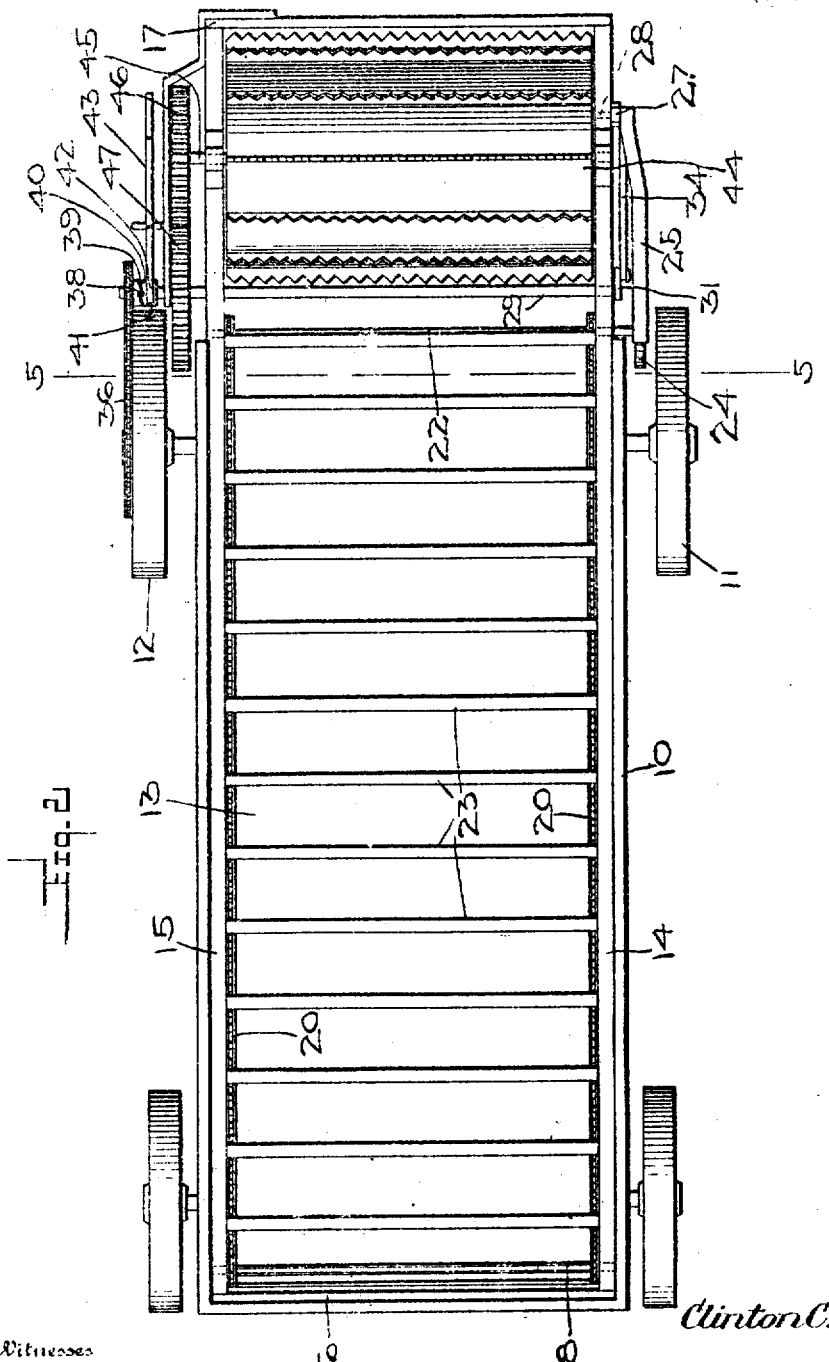

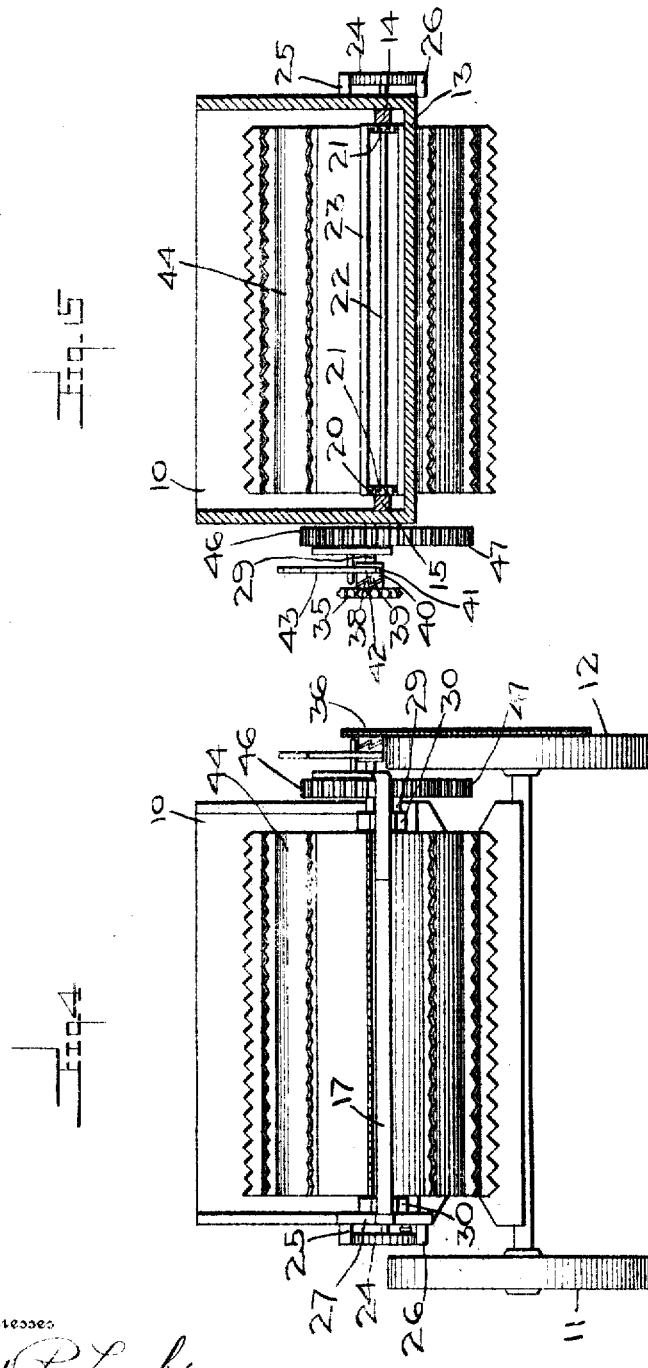

CLINTON C. MORGAN, OF MURDOCK, ILLINOIS.

FERTILIZER-DISTRIBUTER.

No. 904,797.

Specification of Letters Patent.

Patented Nov. 24, 1908.

Application filed June 15, 1908. Serial No. 438,564.

*To all whom it may concern:*

Be it known that CLINTON C. MORGAN, a citizen of the United States, residing at Murdock, in the county of Douglas and State of Illinois, has invented certain new and useful Improvements in Fertilizer-Distributers, of which the following is a specification.

This invention relates to fertilizer distributers and has particular reference to a device which can be readily applied to a wagon.

An object of this invention is to so construct a device of this character that it can be easily applied to a wagon of ordinary construction.

Another object of the invention is to provide the device with a means by which the distributing wheel can be caused to rotate at different speeds relative to the operation of the other movable parts of the device.

A further object is the provision of novel and simple means for operating the distributing wheel by which it will be intermittently and positively driven.

The invention has as a still further object the provision of a mechanism whereby the feeding and distributing means may be operated by the rotation of one of the rear wagon wheels and means whereby the mechanism may be thrown into or out of operation.

Other objects and advantages will be apparent from the following description and it will be understood that changes in the specific structure shown and described may be made within the scope of the claim without departing from the spirit of the invention.

In the drawings forming a portion of this specification, and in which like numerals of reference indicate similar parts in the several views, Figure 1 is a side elevation of the device applied to a wagon, the wagon partially broken away, Fig. 2 is a top plan of the device applied to the wagon, Fig. 3 is a side elevation partly in longitudinal section opposite to that shown in Fig. 1, Fig. 4 is a rear view of the distributer as applied to a wagon, Fig. 5 is a section on the line 5—5 of Fig. 2.

Referring to the drawings, 10 designates the body of a wagon which is mounted upon wheels 11 and 12 at its rear end and which is provided with a bottom 13 upon which the device is adapted to be placed. The device comprises a frame of two longitudinally disposed beams 14 and 15 which are held in parallel at their opposite ends by suitable cross bars 16 and 17. The forward end 16 of the device carries a transversely mounted shaft 18 which extends the full width of the frame and which supports at its opposite ends sprockets 19 over which are adapted to pass endless chains 20. The chains 20 extend backwardly of the frame to an intermediate point where they are supported upon sprockets 21 carried upon a shaft 22 mounted in parallel to the shaft 18. Equidistantly disposed along the chains 20 are a plurality of transverse bars 23 which are mounted upon the outer surfaces of the chains 20 and which are adapted to drag along the bottom 13 of the wagon as the chains 20 are actuated. The shaft 22 extends outwardly from the beam 14 and carries upon its extremity a ratchet wheel 24 which is engaged at diametrically opposite points by pawl levers 25 and 26. The pawls 25 and 26 are pivotally carried upon the ends of a lever 27 which is centrally and loosely mounted upon a stub shaft 28 disposed upon the outer face of the beam 14. Secured to the under edges of the beams 14 and 15, is the main drive shaft 29 by cleats 30. Shaft 29 carries a rigidly mounted arm 31 at one extremity which is situated in juxtaposition to the outer face of the beam 14. The arm 31 is centrally and longitudinally slotted as at 32 and is adapted to receive an adjustable wristpin 33 which supports one end of a pitman 34 which is carried at its opposite end by the lever 27 near its lower end. The shaft 29 loosely carries upon its opposite end a sprocket 35 which supports a chain 36 which passes over a large sprocket 37 carried upon the wheel 12. The sprocket 35 is provided with lateral teeth 38 which engage in teeth 39 carried by a sleeve 40 which is longitudinally slidable on the shaft 29. The inner edge of the sleeve 40 carries a peripheral groove 41 which receives the forked arms 42 of a laterally swinging lever 43. The pawls 25 and 26 are provided with a spring 43 for holding the pawls against the teeth of the ratchet 24. At the rear end 17 of the frame a roller 44 is transversely mounted which is provided with a plurality of radially extending teeth upon its periphery which are adapted to engage in the material fed to the back end of the wagon and to scatter the same. The roller 44 is mounted upon a shaft 45 which carries upon its outer end a gear 46 which meshes with a gear 47 non-rotatably secured upon the shaft 29 and which is adapted to rotate the roller 44.

In operation, the frame is placed in the body of the wagon upon the material placed upon the bottom 13. When the wagon is drawn and the wheel 12 is turned the sprocket 37 actuates the sprocket 35 through the medium of the chain 36. If it is desired to actuate the mechanism the lever 43 is swung inwardly and the clutch member 40 is moved toward the sprocket 35 causing the engagement of the teeth 38 and 39 and the shaft 29 is rotated. The arm 31 is revolved and the pitman 34 reciprocates the lever 27 causing the movement of the pawls and the intermittent rotation of the ratchet 24. This action causes the actuation of the shafts 22 and 18 and the sliding of the transverse bars 23 and the feeding of the material in the wagon toward the back of the wagon. When the shaft 29 is rotated it carries the gear 47 with it and causes the actuation of the roller 44 through the medium of the gear 46. By drawing the lever 43 outwardly the teeth 38 and 39 are disengaged and the sprocket 33 rotates freely upon the shaft 29 which is not actuated.

What is claimed is:

A device of the character described comprising a frame, sprockets mounted in said frame, chains mounted on said sprockets, transverse bars carried by said chains, shafts in said frame adapted to support said sprockets, a ratchet carried by one of said shafts, a stub shaft carried by said frame, a lever centrally and loosely mounted upon said stub shaft, pawls carried at the opposite ends of said lever and adapted to engage said ratchet, a spring carried by said pawls and adapted to tensionally hold the same against said ratchet, a main shaft carried by said frame, an arm carried at one end of said main shaft, a pitman carried by said arm adapted to engage said lever, said shaft, arm and pitman adapted to reciprocate said lever, a sprocket carried at the opposite end of said main shaft, a wagon wheel, a sprocket carried by said wheel, a chain carried by said sprockets and adapted to pass over the same, a roller mounted in said frame, teeth in said roller, a shaft supporting said roller, a gear carried by said roller shaft, a gear carried by said main shaft adapted to mesh with said first named gear, a longitudinally slidable sleeve carried by said main shaft, teeth on said sleeve, teeth on said sprocket on said main shaft, said teeth adapted to engage one another at times and a lever carried by said frame adapted to operate said sleeve.

In testimony whereof I affix my signature, in presence of two witnesses.

CLINTON C. MORGAN.

Witnesses:
B. O. FARRIS,
S. E. HUBER.